United States Patent
Pasternak et al.

(10) Patent No.: US 8,311,082 B2
(45) Date of Patent: Nov. 13, 2012

(54) WIDEBAND DIGITAL RADIO WITH TRANSMIT MODULATION CANCELLATION

(75) Inventors: Eliezer Pasternak, Palo Alto, CA (US); Gregg Levin, Los Altos, CA (US); Idan Bar-Sade, Sunnyvale, CA (US); John Park, San Jose, CA (US)

(73) Assignee: Bridgewave Communications, Inc., Santa Clara, CA (US)

( * ) Notice: Subject to any disclaimer, the term of this patent is extended or adjusted under 35 U.S.C. 154(b) by 820 days.

(21) Appl. No.: 10/987,819

(22) Filed: Nov. 12, 2004

(65) Prior Publication Data

US 2005/0094718 A1    May 5, 2005

Related U.S. Application Data

(63) Continuation of application No. 10/423,154, filed on Apr. 24, 2003, now Pat. No. 6,937,666.

(60) Provisional application No. 60/435,839, filed on Dec. 20, 2002.

(51) Int. Cl.
*H04B 1/38* (2006.01)

(52) U.S. Cl. .......................................... 375/219; 398/59

(58) Field of Classification Search .................. 375/219, 375/272; 398/59, 79, 147; 709/224
See application file for complete search history.

(56) References Cited

U.S. PATENT DOCUMENTS

| | | | |
|---|---|---|---|
| 4,520,474 A | 5/1985 | Vilmur | 370/278 |
| 5,036,299 A | 7/1991 | Dick et al. | 331/25 |
| 5,241,566 A | 8/1993 | Jackson | 375/277 |
| 5,436,930 A | 7/1995 | Bremer et al. | |
| 5,440,585 A | 8/1995 | Partridge, III | |
| 5,446,762 A * | 8/1995 | Ohba et al. | 375/324 |
| 5,448,555 A | 9/1995 | Bremer et al. | |
| 5,463,660 A * | 10/1995 | Fukasawa et al. | 370/342 |
| 5,537,436 A | 7/1996 | Bottoms et al. | |
| 5,537,441 A | 7/1996 | Bremer et al. | |
| 5,844,944 A | 12/1998 | Betts et al. | |
| 5,859,877 A | 1/1999 | Betts et al. | |
| 5,881,047 A | 3/1999 | Bremer et al. | |
| 6,018,644 A | 1/2000 | Minarik | 455/82 |
| 6,151,354 A | 11/2000 | Abbey | 375/211 |
| 6,265,948 B1 | 7/2001 | Stevenson | 332/101 |
| 6,282,248 B1 | 8/2001 | Farrow et al. | 375/324 |
| 6,741,643 B1 * | 5/2004 | McGibney | 375/229 |
| 6,798,784 B2 * | 9/2004 | Dove et al. | 370/463 |
| 6,879,663 B2 * | 4/2005 | Fox | 379/1.03 |
| 7,184,466 B1 * | 2/2007 | Seemann et al. | 375/219 |
| 2002/0015206 A1 * | 2/2002 | Hakimi et al. | 359/161 |
| 2002/0046276 A1 * | 4/2002 | Coffey et al. | 709/224 |
| 2002/0067755 A1 * | 6/2002 | Perkins | 375/130 |
| 2002/0122503 A1 * | 9/2002 | Agazzi | 375/316 |
| 2002/0129379 A1 * | 9/2002 | Levinson et al. | 725/129 |
| 2002/0193067 A1 | 12/2002 | Cowley et al. | 455/3.02 |
| 2003/0081700 A1 | 5/2003 | Birru | 375/340 |
| 2003/0110509 A1 * | 6/2003 | Levinson et al. | 725/121 |
| 2003/0154495 A1 * | 8/2003 | Sage | 725/121 |
| 2004/0136711 A1 * | 7/2004 | Finan et al. | 398/59 |
| 2011/0013911 A1 * | 1/2011 | Alexander et al. | 398/79 |

* cited by examiner

*Primary Examiner* — Leon-Viet Nguyen
(74) *Attorney, Agent, or Firm* — DLA Piper LLP (US)

(57) ABSTRACT

A microwave radio assembly is described including a directional antenna wherein the installation and aiming is simplified. The assembly is attached to the wall-mount fix via gimbals mechanism with one rotation axis for azimuth and one for elevation and the assembly preferably includes a sight mechanism including a pair of visual apertures is located in the radio assembly in a line parallel to the radio antenna radiation direction. The radio assembly further includes a modulation cancellation scheme in full duplex mode.

5 Claims, 9 Drawing Sheets

WIDEBAND DIGITAL RADIO WITH TRANSMIT MODULATION CANCELLATION

RELATED APPLICATION

This application claims priority under 35 USC 120 and is a continuation application of U.S. patent application Ser. No. 10/423,154 filed on Apr. 24, 2003 now U.S. Pat. No. 6,937,666 which in turn claims priority under 35 USC 119 to U.S. Provisional Patent Application Ser. No. 60/435,839 entitled "Wideband Digital Radio with Transmit Modulation Cancellation" and filed on Dec. 20, 2002, the entirety of both patent applications are incorporated herein by reference.

FIELD OF THE INVENTION

This invention relates generally to the fields of microwave digital radio transmission, digital modulation and microwave radio front-end design.

BACKGROUND OF THE INVENTION

High bit rate communications networks are becoming more popular with the proliferation of computers with fast digital ports, such as Gigabit-Ethernet ("GigE"). In many situations it is desired to extend a local network link to an adjacent building or to a metropolitan fiber optics link available for access across the street or a few hundred meters away. When the installation of fiber optics for the desired link is hampered by economical or regulatory obstacles, a wireless solution is a preferred alternative. Some links use free-space optics (FSO), however the vulnerability of the link to fog makes it a poor choice in many locations, and a radio-frequency solution is preferred.

A promising spectrum allocation for wideband radio links applications is the high millimeter band, in the 50 GHz to 100 GHz range, and more specifically the 60 GHz band and similar bands which are offered by governments for license-free operation or easy licensing arrangements and fewer spectral-use constraints than those in lower bands. Because of the high directivity of antennas at this frequency and the absorption of oxygen and water vapor in some of these bands, each link is essentially private, free of interference from other links, thus some of the interference rejection measures can be relaxed in a radio design for cost reduction. The availability of several GHz per band is highly suitable for wideband yet low cost applications, because simple modulation schemes can be used, utilizing the wide bandwidth to gain cost reduction.

A low cost radio at these high frequencies requires several simplifications compared to digital radio links typically in use today. The radio must be easy to install and align by less experienced personnel, preferably with a skill set similar to those who install satellite television antennas. The antenna alignment mechanism should be intuitive to point to a desired direction and should obtain a fraction of a degree in angular precision without the need for electrical alignment aids. Since the cost of a millimeter-wave radio is highly affected by the cost of the front-end circuitry, that part of the system should be minimized in complexity.

One technique that has been utilized to simplify a radio front-end complexity is the use of the transmitter as a local oscillator for down conversion of the received signal. The separate local oscillator circuit is eliminated, having fewer components at high frequency. Such scheme requires transmit-modulation cancellation in the receiver. The modulation for the transmitted signal is delayed and subtracted at the right amplitude from the received signal. Such schemes have been disclosed in U.S. Pat. Nos. 4,134,068, 4,238,850 and 4,520,474. While these techniques reduce the front-end component count, they require precise replication of the transmitted signal after being modulated. Since modulators are non-linear and temperature dependents, the cancellation circuitry may require signal recovery feedback loops or other compensation circuitry that may add significantly to the complexity and cost it intended to reduce. It is desired to benefit from modulation cancellation simplicity without precision signal-domain subtraction. It is further desired to reduce the size and number of active components in a radio front-end without significant sacrifice in performance.

Thus, it is desirable to provide a wideband digital radio with transmit modulation cancellation in accordance with the invention that overcomes these limitations of the typical systems.

SUMMARY OF THE INVENTION

The need for simple installation and aiming is provided in accordance with this Invention by a radio assembly, including a directional antenna, which is attached to the wall-mount fix via a gimbals mechanism with one rotation axis for azimuth and one for elevation. A sight mechanism including a pair of visual apertures is located in the radio assembly in a line parallel to the radio antenna radiation direction. A mirror located at the rear-side of said apertures bends the visual path sideways to allow the installer to check the antenna alignment without having to place his head behind the assembly. A typical installation process includes bolting the radio assembly to a wall or a pole using the wall mount. After the electrical and fiber optics cables are attached and the radio is sealed, the installer loosens the gimbals structure enough to allow movement with friction. The installer now aligns the radio assembly by moving it with both hands and observing the alignment via the sight simultaneously. Since the remote side of this radio link is only a few hundred meters away, the remote side is visually placed in the center of the visual aperture of the sight. If the remote radio is too small to observe, high-contrast posters can be mounted temporarily around the remote radio or light sources can be used as well. When alignment is completed, the gimbals mechanism is tightened.

The radio in accordance with the invention also provides a simplified radio architecture using a modulation cancellation scheme in full duplex mode. In accordance with this Invention, a modulation with essentially a constant envelope is used, wherein the digital information is encoded in the frequency or phase of the signal. Since the transmitted signal is used as the local oscillator for down-conversion of the received signal, the received signal appears to contain the difference between the received and transmitted phase and/or frequency. Since the transmitted phase or frequency is not necessarily a linear transformation of the intended modulation, as is apparent when a varactor diode is used for directly modulating an oscillator, no attempt is made to subtract the transmitted modulation. Instead, a demodulator is used for receiving the combined signal. The demodulator performs a conditional demodulation operation, in which the demodulation operation is conditioned upon the digital values of the transmit signals. Such conditional operation includes digitally-controlled analog multiplexing of interim demodulation options, or by first producing a bit stream that is a combination of the transmitted and received information wherein the transmitted bits are eliminated from the combination by performing the effective logic operation, such as exclusive OR between the received bit and the corresponding transmitted bit. The ability to cancel the transmit information by a logic operation between transmitted bits and received bits, as done in accordance with this Invention, is far simpler than the typical technique of subtracting the transmit modulation in the signals domain, regardless of the use of analog or digital signal processing techniques to subtract such signals.

While the binary transmit-modulation cancellation in the received signal can be done even if the timing of the transmitted bits does not coincide with (is not synchronized with) the received bit timing, a better performing receiver would have synchronization between the timing of the transmitted bits and the received bits. Since such coincidence (synchronization) cannot be guaranteed for an arbitrary distance, timing is equalized in accordance with this Invention by slightly increasing the baud rate in both sides side of the link until a coincidence (synchronization) is accomplished. In particular, the baud rate adjustment occurs in one transmitter referred below as "master". The opposite radio, called "slave", tracks the master's baud rate and uses it for its own transmission. The control loops in the master and slave radios for maintaining such timing coincidence are disclosed in the detailed description below. The excess baud rate is filled with stuff words, which are removed by the receiving end before the data is delivered to the end-user. A method of stuffing-removal of such words is disclosed in the detailed description below.

Further reduction in complexity is provided in accordance with this invention by an integrated radio front-end unit, in which a single active device is performing the functions of both a local oscillator, a transmitter and a receiver. Other devices in the front-end are passive, including resonators and filters. Further simplification is obtained by the use of passive devices fabricated using Micro Systems Technology (MST), which is sometime referred to also as MEMS. The local oscillator function is based on an amplifier with a feedback loop consisting of passive filters and resonators. This feedback loop requires a small round loop delay compared with the reciprocal of the modulation bandwidth and low losses in the filter and resonator circuits inside the loop. These requirements are difficult and sometimes impossible to meet using conventional techniques such as waveguide resonators. By using MEMS-based filters and resonators, both requirements can be met. MEMS resonators also provide frequency precision sufficient to eliminate the need for a quartz crystal reference and related frequency multiplication circuits for some of the high-speed applications.

While several radio front-end configurations are disclosed below, they all share the common use of the transmit signal as local oscillator for the receive signal and thus eliminate local oscillators and the associated synthesizer and frequency multiplying chains fond in most conventional radio designs, thus a significant part cont reduction is accomplished, yet the design is inherently free of spurious transmissions of local oscillator mixed components.

DETAILED DESCRIPTION OF A PREFERRED EMBODIMENT

The invention is particularly applicable to a frequency shift keying (FSK) microwave radio and it is in this context that the invention will be described. It will be appreciated, however, that the radio and method in accordance with the invention has greater utility since its teachings may be applied to other modulation schemes and techniques as well as to other frequency domains.

Figure 1:
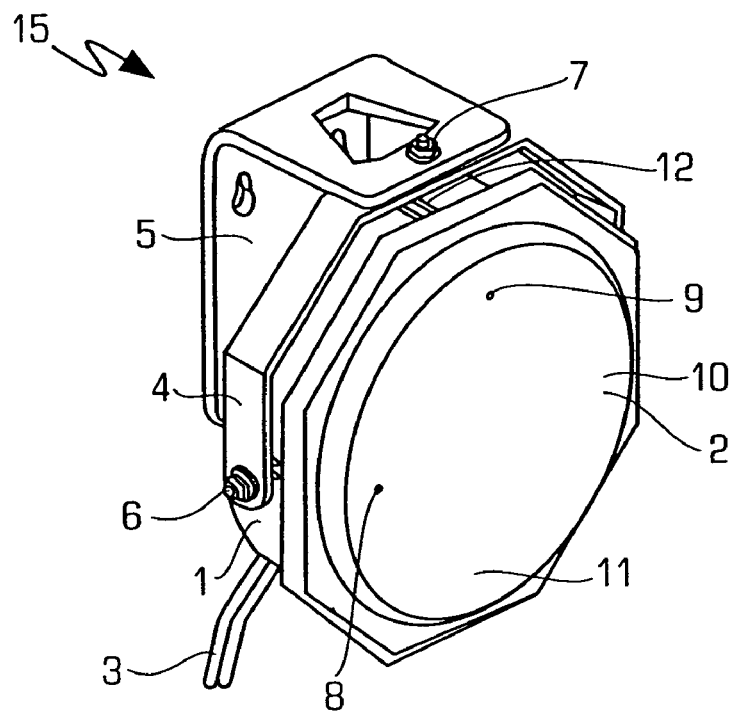
FIG. 1 shows an external view of a radio assembly including the antenna, alignment mechanism and sight-openings.

A radio assembly 15 of a preferred embodiment is depicted in FIG. 1. The radio 15 includes an enclosure 1 for the electronics and antenna, a radome 2 and attached electrical and fiber optics cables 3. The radio 15 is attached via a gimbals mechanism 4 to a mounting bracket 5, which is usually attached to a wall or a pole by any typical attachment mechanism, such as a bolt. The gimbals mechanism may preferably include two axes 6 and 7 that allow simultaneous radio movement by the installer of the radio's azimuth and elevation until a desired pointing angle is achieved. Since a typical high-gain antenna at millimeter wave frequencies has a beam width of approximately 1.5 degrees, precise alignment up to a fraction of a degree is necessary. Since both sides of the link may possess a high-directivity antenna, electrical adjustments are very difficult, because both antennas must point at each other quite precisely before either side can receive signals of adequate strength.

A preferred alternative in accordance with the invention to the electrical adjustment is a visual alignment mechanism. It is possible by current machining technology to manufacture the main antenna with a fraction-degree tolerance between the mechanical reference-plane and the direction of the radiated beam. Therefore, a sight-mechanism placed parallel to the antenna beam can provide adequate directional indication. A sample location 8 for a front aperture of a sight is depicted.

Figure 2:
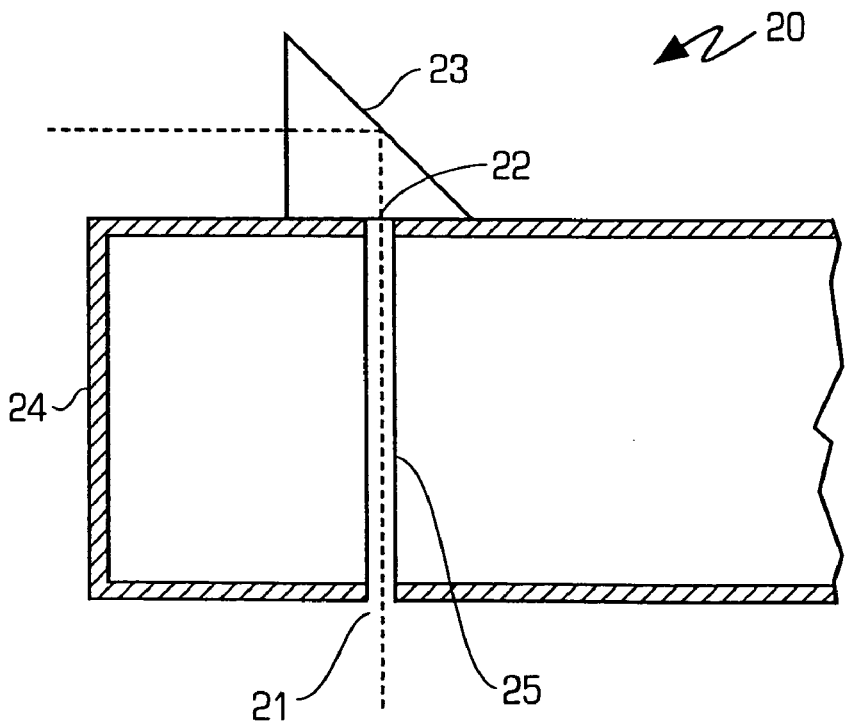
FIG. 2 shows the optical components of the alignment sight.

FIG. 2 illustrates more details of a preferred embodiment of a sight mechanism 20 in accordance with the invention. The sight 20 consists of a front aperture 21, a rear aperture 22 and a ray-bending mirror 23, placed at the rear of the radio enclosure 1. In another embodiment, a hollow tube 25 provides environmental protection to the inside of the enclosure 1, or an optical window is placed at the front aperture 21. The bending mirror 23 allows the installer to observe the antenna sight in the limited space behind the radio enclosure and the wall behind in that the installer does not need to be behind the enclosure 1 to perform the alignment. To align the radio, the installer observes the image of the remote radio thought the sight and aligns the radio assembly with simple hand manipulation of the gimbals mechanism 4 until the remote radio is observed at the center of the sight aperture. The front aperture 21 diameter is selected so that the typical angular width of the aperture 21 as viewed from the observer's eye position is approximately 1.5 degrees. Precision of this angle is not critical, as the installer can visually place the remote radio in the center of the aperture 21, regardless of width. After proper alignment is accomplished, the installer can tighten the gimbals mechanism axes mechanisms 6, 7 and verify again the alignment optically.

Returning to FIG. 1, since this sight mechanism is simple and low cost, several sights can be placed in the radio assembly 1, such as in locations 9, 10, 11, such that the alignment can be performed and observed from any side. Furthermore, it is possible to mount the radio assembly 1 rotated 90 degrees for cross polarization operation, if desired, by rotating the radio assembly 1 and relocating the axis 6 to a perpendicular point 12. Thus, a plurality of sights allows easy visual alignment at any polarization.

While the above sight mechanism is built-in, it is also possible to use as an alternative external, commercially available optical pointing devices, such as gun sights, and attach them to holes in the radio structure, such as one of the holes 8, 9, 10, 11.

Figure 3:
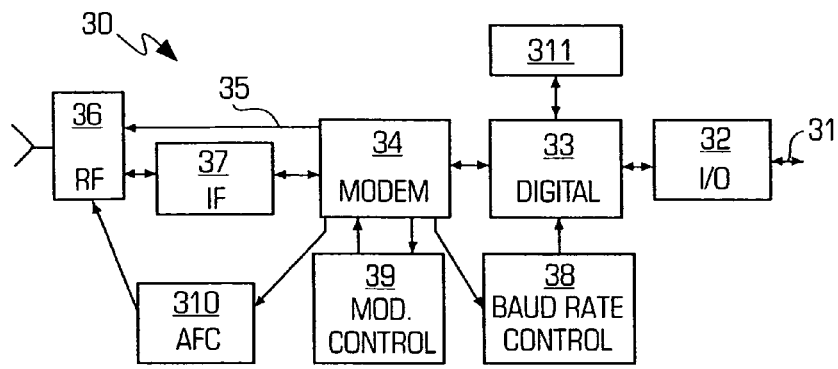
FIG. 3 is a high-level block diagram of the radio electronics.

An electrical block diagram of a preferred embodiment of a radio 30 is depicted in FIG. 3. A radio link consists of two such systems facing each other at a typical distance of a few tens to a few hundreds of meters. In a preferred embodiment, each radio operates in a full duplex mode, regardless of user payload. In the full duplex mode, if the user has no information to send, an idle code is transmitted. The connection with a local computer and/or a communications network (not shown) is performed via an I/O port 31 which permits the digital data to/from the radio to be communicated to the local computer or communications network. The I/O port 31 is application-specific and can be modified for various different applications, however the preferred embodiment is best illustrated in a Gigabit-Ethernet application (GigE). In this preferred application, the port 31 is either electrical or fiber optics, and an appropriate I/O processor 32 is used which is commercially available for various applications, including GigE and Sonet/SDH. As is well known, the I/O processor 32 acts as an interface between the entity that uses the data from the radio and the radio. A Digital Section 33 mediates between the I/O processor 32 and a radio modem 34. The digital section 33 performs functions such as buffering, framing, serial to parallel word conversion and forward error correction (FEC). The digital section 33 is also responsible for the word stuffing and de-stuffing associated with the baud rate adjustment process as described below in more detail. The implementation of the Digital Section 33 is straight-forward to engineers skilled in the art, using field programmable gate arrays (FPGA) or ASIC technologies so that only subsystems and processes of special significance to this Invention will be further discussed in detail below.

The modem 34 may perform various well known phase or frequency modulation operations. In a preferred embodiment, the modem 34 in accordance with the invention may perform well known frequency shift keying (FSK). Since the radio 30 includes the direct modulation of a VCO (as described below), the modem 34 sends the transmit baseband signals via a transmission line 35 directly to a radio frequency (RF) front-end 36. The receive signals, on the other hand, are sent to an interface (IF) section 37 that amplifies and filters the receive signals before the received signal is demodulated at the modem 34. The radio 30 further includes a baud rate control loop 38, related to bit timing alignment, and a modulation control loop 39 for adjusting the modulation level of the transmitted signal. The modem 34 may also include a well known automatic frequency control (AFC) loop 310. A microcontroller 311, based on a commercially available integrated circuit (IC), performs various housekeeping tasks which include system initialization and signal conditioning tasks associated with the Baud Rate Control loop 38. Other blocks, which are obvious to engineers skilled in the art, are not shown. For example, a power supply and other elements are omitted from FIG. 3.

Figure 4:
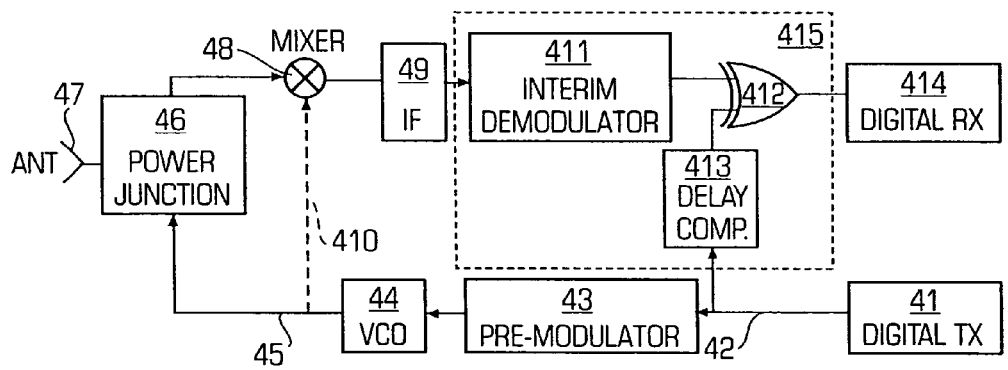
FIG. 4 shows the main building blocks in a radio transceiver associated with logic-level modulation cancellation.

The general principle of a digital modulation cancellation method and system in accordance with the invention is shown in FIG. 4. A composite digital bit stream, including user information (data) input by the I/O port 31 (See FIG. 3) and all of the related overhead, is generated by a transmit section 41, which is a part of the Digital Section 33 shown in FIG. 3. The binary transmit signal is delivered by a transmission line 42 to a pre-modulator 43. The line 42 may be a single high-speed binary signal line (serial line) or a bus containing several parallel bit streams. The pre-modulator 43, a part of the modem 34 shown in FIG. 3, conditions the binary signals communicated over line 42 for the final modulation step carried out by a well known voltage controlled oscillator (VCO) device 44. This conditioning by the pre-modulator 43 includes signal level translation, parallel to serial conversion if necessary, and low pass filtering, also known as pulse shaping. The signal delivered to the VCO 44 has two levels (digital logic 1 and digital logic 0) and the transitions between them, which is essentially a filtered NRZ signal. The resulting modulation at the output of the VCO is binary frequency shift keying (B-FSK). For simplicity of description, the FSK signal is described as consisting of two distinct frequencies, i.e. frequency T0 for a binary "zero" bit transmission and T1 for binary "one" bit transmission as described in more detail below with reference to FIG. 5. The actual modulated signal also contains transition periods, which last a fraction of a bit period and are adjusted at the pre-modulator 43 to a degree of abruptness compatible with the radio frequency allocation. The actual transmit spectrum is affected by these transitions and by the frequency deviation between T0 and T1. In a preferred embodiment, T0 and T1 are set at one half the (maximum) baud rate, which is essentially Minimum Shift Keying (MSK), however other spacing can be used if the channel bandwidth allows and obtaining higher deviation at the VCO 44 is economically feasible. The VCO 44 produces a modulated transmit signal which is fed by a transmission line or a waveguide 45 to a power junction 46 and an antenna port 47. The power junction 46 consists of any suitable microwave device such as a diplexer, circulator or a power divider with a directional coupler. The choice of the particular power junction is design-specific. Some specific choices are discussed below in conjunction with FIGS. 12, 13 and 14.

A receive signal arrives at the antenna port 47 and is delivered via the power junction 46 to a mixer 48. An optional low-noise amplifier (LNA) (not shown) may be included. The frequency of the receive signal is different from the transmit frequency, thus if both the transmit signal on line 45 and the receive signal are present at the mixer 48, a frequency difference will be generated (an If frequency) and will be delivered to an IF section 49. A typical mixer 48 is a single port device, usually implemented by a diode. If the power junction 46 does not leak strong signal from the VCO output on line 45 towards the mixer port, an alternative bypass line 410 can provide the local oscillator function and the mixer 48 may be a three port unit. The IF section 49 receives the frequency difference signal and performs amplification and filtering. A conditional demodulator 415 recovers the receive bits based on the mixed signals at the IF 49 output and the transmit bits 42. An example of internal structure of a conditional demodulator 415 includes an interim demodulator 411, a delay compensator 413 and a logic gate 412. The interim demodulator 411 detects the discrete frequencies of the combined IF signal similar to a conventional FSK demodulator, except that the mixing with the transmit signal may create more than two discrete frequencies, However, based on prior knowledge of the transmit binary data, the interim demodulator 411 can be controlled to monitor only two relevant frequencies at a time, as will described later, in conjunction with FIGS. 5, 6, 7 and 7a. While the interim demodulator 411 emits logic levels of one and zero at its output, the actual value of each logic-level signal is affected by the transmit signal, thus a compensation gate 412 eliminates the effect of the transmit bits on line 42 which are properly delay compensated by a delay line 413 before being sent to the gate 412. While an exclusive OR (XOR) logic gate is depicted, the actual logic is specific to the choice of frequencies and modulation-type, and the proper logic can be derived from a specific truth table as is well known. If the high-speed of the digital transmission does not allow simple analog switching of sections within the demodulator 411, the demodulator may contain multiple parallel demodulating sections, each associated with a different transmitted logic value. For example, in a binary FSK, one demodulator assumes transmitted zero and thus observes the IF signals with that assumption while another section assumes transmitted one. The logic gate 412 selects of the bit received by the section that assumes the actual transmitted bit, as discussed later in conjunction with FIG. 7a. The received bits output from the gate 412 are delivered to a receive-digital section 414 for further processing and delivery of the payload to the I/O port. Typically for high-speed data, the output of the gate 412 is driven to a well known serializer-deserializer (SERDES) device at the digital section 414.

The timing of the transmit (TX) and receive (RX) signals need not be matched. In this case, transitions of the TX signal at the mixer 48 may occur in the middle of the reception of a bit, thus the bit will appear to be sliced between two logic levels at the demodulator 411 so that part of a bit may be demodulated as a zero and the other demodulated part as a one. The modulation correction gate 412 will still rectify the bit to the correct value, except for a glitch during the transmit bit transition. The glitch in the TX signal can be cleaned up with proper low pass filtering. While reception of random TX/RX timing as above is feasible, there is a degradation in bit-error performance, thus the timing correction by baud rate adjustment is provided in a preferred embodiment as described below in more detail.

The above description illustrates more clearly the advantage of binary transmit-modulation cancellation. In particular, although the VCO 44 is not linear in conversion of voltage to frequency and it would be extremely complex and expensive to predict the VCO frequency and subtract it in the demodulator 411, the digital cancellation in accordance with this invention is performed by essentially a single gate 412. Thus, although the timing correction loop is added, it is a good tradeoff.

Figure 5:
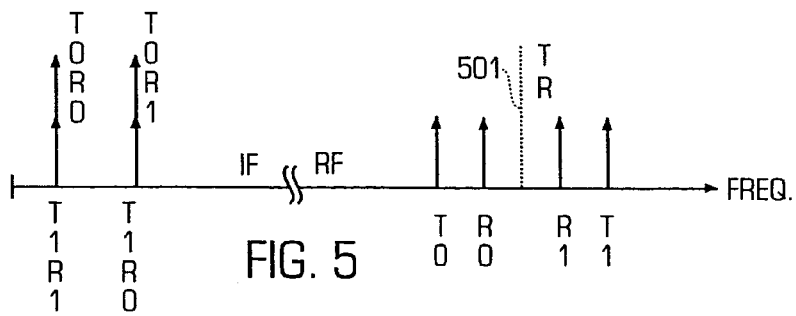
FIG. 5 depicts frequency allocation for a binary FSK link in which both sides use the same center frequency but different deviation such that the IF band has only two symbol-frequencies.

A preferred FSK frequency allocation is shown in FIG. 5, as discussed by the following example. In this example, a first radio and a second radio are communicating with each other separated by some distance. In this example, one radio transmits a "0" at frequency T0, for example 60 GHz and the same radio transmits a "1" at T1=64.5 GHz. The opposite link radio transmits at R0=61.5 GHz and R1=63 GHz. It is apparent from FIG. 5 and the above example that both radios share the same center frequency 501, which is 62.25 GHz in this example. In the IF section, all frequency differences between a "T" and an "R" are possible. For example, if a "0" is received while a "0" is transmitted (T0R0), an IF frequency of 1.5 GHz (the difference between the frequency of the received and transmitted signals) is produced, which is marked "T0R0" in FIG. 5. Using a similar naming convention, T0R1 (transmit a "0" and receive a "1") and T1R0 are received at 3 GHz, while T1R1 is received at 1.5 GHz. A novel feature of this scheme is the fact that the demodulator receives only two IF frequencies, identical to a simple binary FSK receiver, thus a conventional demodulator can be used, and the only correction required is an exclusive OR (XOR) (or NXOR) operation between the "T" bit and the "R" bit after demodulation. The transceiver at the opposite side has an identical pair of IF frequencies and also uses a single XOR gate (or NXOR gate) for modulation cancellation.

Figure 6:
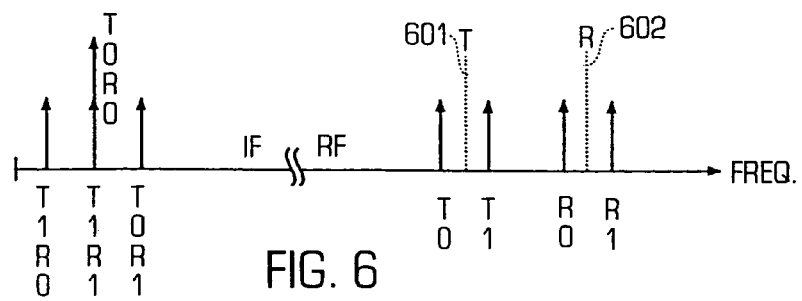
FIG. 6 is a variant of the arrangement of FIG. 5 in which each side has a different center frequency and the IF band has three symbol-frequencies.

While this preferred embodiment has high simplicity, there is a burden of high deviation in the VCO producing T0 and T1 and a diplexer may also be difficult to implement, thus it is sometimes more advantageous to use an alternative embodiment as shown in FIG. 6. Using the same nomenclature as in FIG. 5, this frequency allocation scheme separates the transmit band from the receive band, thus allowing more freedom in the choice of the IF frequency. In this embodiment, the center frequency for the local transmitter is marked "T" 601, and for the remote transmitter "R" 602. For example, "R" may be 64.75 GHz and "T" may be 60.75 GHz. In FIG. 5, the local and remote center frequencies were identical. The drawback of this second method is the presence of three distinct frequencies (T1R0, T0R1 and T1R1/T0R0) instead of two. In principle, this IF signal is a three level FSK, in which during the transmission of every TX bit, only two out of the three levels are possible. However, in accordance with the invention, the third level can be switched off by a fast switching device driven by the value of the transmitted bit. The implementation of a suitable demodulator for this three level FSK in accordance with the invention now will be further discussed in conjunction with FIGS. 7 and 7a.

Figure 7:
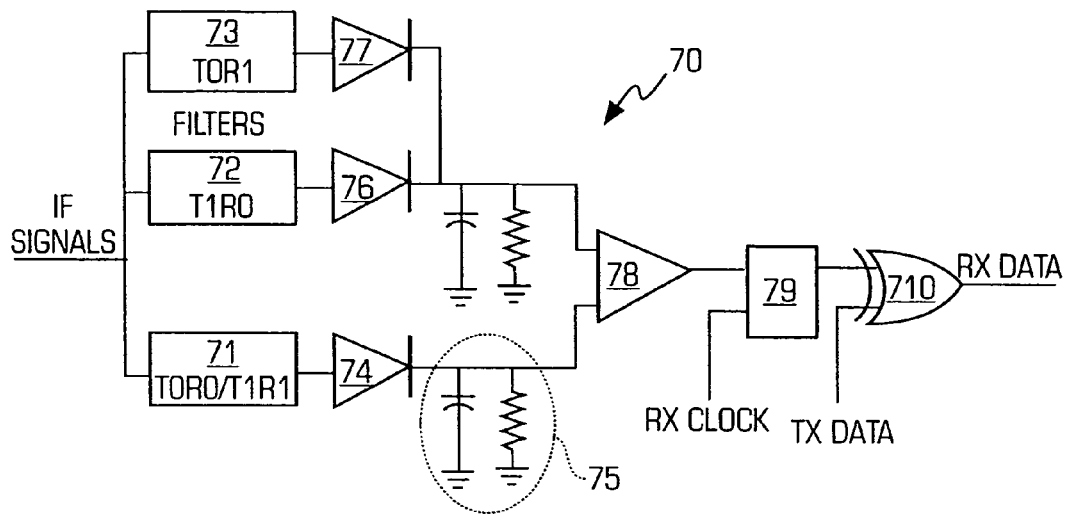
FIG. 7 depicts an FSK demodulation circuit in a preferred embodiment with three-symbol frequencies IF.

FIG. 7 is a block diagram illustrating a three level FSK demodulator 70 and is best understood by an example. For the example, suppose that T0=60 GHz, T1=61.5 GHZ, R0=64 GHz and R1=65.5 GHz. It is then apparent that:

$$T1R0=4\text{ GHz}, T0R0=T1R1=5.5\text{ GHz and }T0R1=7\text{ GHz}.$$

which are the three IF frequencies. The demodulator 70 may have three filters 71, 72, and 73, which can be implemented on printed circuit materials suitable for microwave frequencies, such as Rogers Material. The demodulator may correspond to the demodulator 411 shown in FIG. 4 and may receive the IF unit 49 output signals as described above. The filter 71 represents a binary hypothesis that always exists because either T0R0 or T1R1 is always present and thus it is followed by a conventional envelope detector 74 (a diode in this example) and a low pass filter 75 (implemented in this example of a well known resistor and capacitor combination). This implementation is a non-coherent receiver. A coherent receiver may be used in accordance with the invention, but would be more expensive. The hypothesis of the other bit depends on the transmitted signal, thus T1R0 is a valid hypothesis if a "1" was transmitted and filter 72 is used, while filter 73 should be included only if a "0" was transmitted. The filter selection can be done by an RF switch, e.g. by using Schottky diodes as is well known. Alternatively, as shown in FIG. 7, a simple diode summing (a wire AND) of the two envelope detectors 76 and 77 of the filters 72, 73 provides effectively simple switching with only a fraction of a dB of degradation of the radio channel noise tolerance compared with ideal complete on/off switching.

Figure 7A:
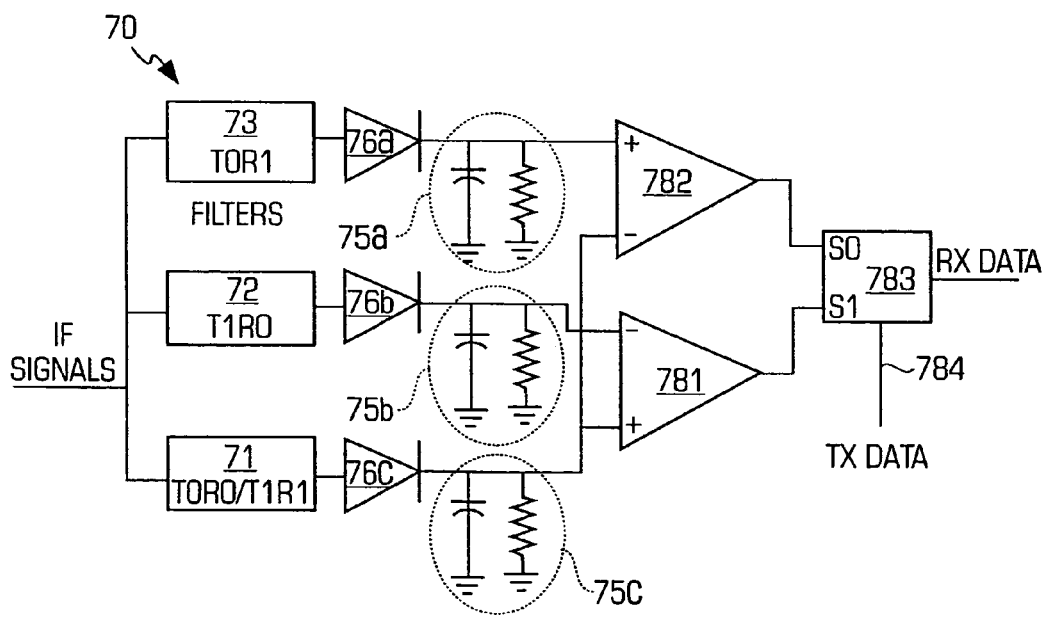
FIG. 7a depicts the FSK demodulation circuit as in FIG. 7 with dual comparator and modified logic for modulation cancellation.

A comparator 78 and a bit-timing "D" flip-flop or a latch 79 are the same as a conventional demodulator and operate in the same manner. An exclusive OR gate (XOR) 710, that corresponds to the logic gate 412 in FIG. 4) cancels the TX modulation. It is assumed here that bit-timing alignment is provided, otherwise the latch 79 is bypassed and low glitch reduction is provided past the gate 710 output, usually by the SERDES. When the overall circuit of FIG. 7 is compared with a conventional FSK receiver, it is apparent that the complexity penalty of the three-frequency approach is merely the extra filter 73 and diode 77. Another embodiment of the three level FSK demodulator is depicted in FIG. 7a. In this embodiment, each IF frequency has an independent peak detectors 76a-c and low pass filters 75a-c so two comparators 781, 782 are used. One comparator 781 examines the "Transmitted 1" or T1 assumption, i.e. T1R1 vs. T1R0. The other comparator 782 assumes zero transmitted, or T0R1 vs. T0R0. For each bit period, only one of the two comparators 781, 782 contains valid information. A multiplexing gate 783 selects the right comparator output based on the value of a properly timed TX Data signal 784. While the design of FIG. 7a is only slightly different from FIG. 7, the logic function is completely different (a multiplexer 783 vs. an XOR gate 710). While the logic function varies, the determination of the right logic function is simple, once the structure for making interim logic level decisions is chosen.

While the above examples demonstrate binary operation, the generalization of these circuits for more bits per symbol is straightforward. In the FSK mode, each side transmits multi-level FSK, i.e. M-level FSK, wherein M specifies the number of discrete levels. The IF therefore includes multiple possible frequencies. For example, if the transmission/reception frequency ranges do not overlap, as was shown in FIG. 6 for the M=2 case, there will be 2M−1 IF frequencies (there are 3 frequencies for M=2 in FIGS. 6 and 7).

Figure 7B:
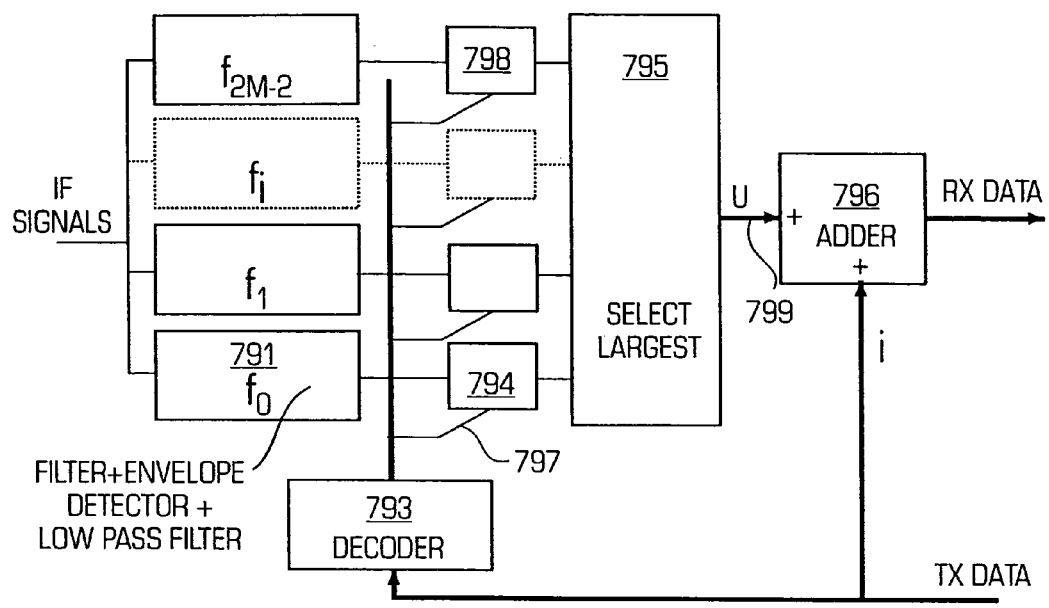
FIG. 7b depicts an FSK demodulation circuit for an M-level FSK modulation.

A general M-FSK conditional demodulator for essentially orthogonal signals is depicted in FIG. 7b. The IF signals are processed by 2M−1 parallel circuits, which are referred to by indices from 0 through 2M2 ($f_0 \ldots f_{2m-2}$). Each circuit, such as $f_0$ 791 includes a bandpass filter, an envelope detector and a low pass filter, similar to the channel elements 71, 76c 75c depicted in FIG. 7a. Each signal is controlled by an electronics ON/OF switch 794 controlled by a line 797 from a decoder 793. The decoder is controlled based on the transmitted data signal as shown. When a switch 794 is enabled ("ON"), the channel 791 signal is driven to a "Select Largest" circuit 795, otherwise the switch is disabled ("OFF") and no signal, or negligible signal level is presented to the "Select Largest" circuit 795. For each symbol transmitted, the Decoder 793 enables M switches out of the 2M−1, such as switches 794, 798.

The logic of enabling can be described by the following convention. The transmitted binary word is referred by the index "i" from 0 through M−1. The received binary word (yet undetected) is referred by the index "j" from 0 through M−1. The IEF channels are indexed from 0 through 2M−2, as depicted. If frequency i was transmitted, the M switches with indices from M−1−i through 2M−2−i are enabled. The dynamic enabling disabling of the switches demonstrates the conditional aspect of the demodulator.

The Select Largest Section circuit 795 outputs an index from 0 through 2M−2 (the signal with the largest index which reaches the select largest circuit) at an output bus 799. This binary value from the select largest circuit is referred below as "U". This unit 795 is well known in the art of digital receivers for multi-level communications and it includes comparators and logic gates. An adder function 796 receives the output U as well as the transmitted data signals and eliminates the transmitted content in U and the index shift, by calculating the received word "j" as:

$$j=U-M+1+i$$

For implementation convenience, the Select Largest unit 795 may be designed so that the index bus 799 includes the subtraction M−1, thus the output 795 will consist of U−M+1. The Select Largest section 795 performs the interim demodulation (as described above) while the adder 796 performs the transmit modulation cancellation as described above.

Figure 8:
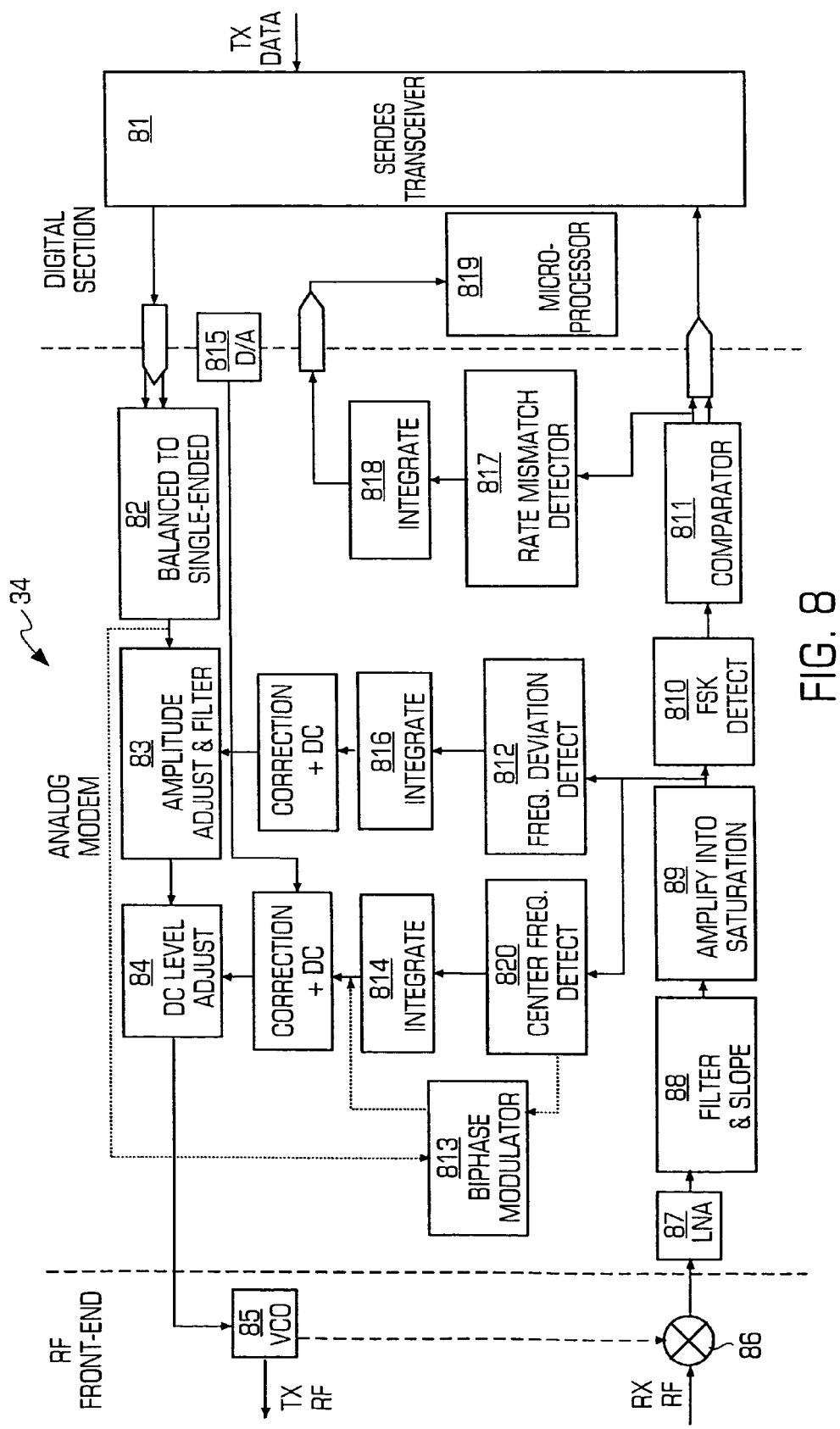
FIG. 8 is a block diagram of the automatic control loops in the IF and modem sections of the radio.

FIG. 8 depicts the various control loops in the modem section 34, which in a preferred embodiment, are implemented using analog circuits. The main signal path is described first. The transmit digital stream is output from the system FPGA as a parallel word, because commercial low-cost FPGA units are limited in digital speed and thus cannot output at the system desired rate of approximately 1.4 Gbps, which provides for a Gigabit Ethernet traffic and overhead. Therefore, the parallel word is converted to a serial format by a SERDES transceiver 81, which is commercially available from Texas Instruments as part number TLK2201. The SERDES output is converted from differential to single-ended using an analog device 82 such as a BALUN transformer. Low-pass filtering and amplitude adjustment are then performed by an analog circuit 83, which is essentially the pre-modulator 43 discussed above. The filtering is part of the communication channel frequency response and, as mentioned above, is a compromise between short signal rise time and a bound spectral occupation wherein the optimum is selected based on the application. In the 60 GHz band, a rise time of approximately 0.1 of a bit-period is preferred. The amplitude of the signal at this point is affecting the deviation of the transmitted signal at a VCO 85. The signal is then fed into a DC level adjust 84 that is used for fine-tuning the transmitted frequency at the VCO 85. In the receive side, the IF signal from a receive mixer 86 is amplified by an low noise amplifier 87 (not to be confused with a radio front-end LNA if in use), a filter 88 and further amplifiers 89 that may saturate, given a constant-envelope signal. The signal is then FSK-detected by an FSK detector/demodulator 810, such as the circuit shown in FIGS. 7 and 7a, and after a comparator 811 (the same comparator 78 as in FIG. 7), sent to the SERDES. The modulation cancellation XOR function and flip-flop timing occurs in the Digital Section.

The Automatic Frequency Control (AFC) function as described above is performed by an FM discriminator circuit 812 (a frequency deviation detector circuit), followed by the conventional elements of an AFC loop. The discriminator function 812 requires special attention with regards to the IF signals received in accordance with this invention. In particular, in the three-frequency IF option shown in FIG. 6, a conventional FM discriminator is sufficient, and tracking the center frequency of one of the three signals, such as T1R0 would suffice. The case is different when a two signal arrangement shown in FIG. 5 is in use. For example, a frequency increase of the transmitter, i.e. T0 and T1 move higher in FIG. 5, would cause a split of each IF frequency, since T0R0 would decrease and T1R1 would increase, creating ambiguity in the AFC loop. This situation can be corrected by two main methods. One method uses the transmitted bits as indicators of the frequency shift direction, thus it includes multiplying the discriminator 812 output by the polarization of the transmitted bit, using a bipolar modulator 813 to replace the direct connection 814 to the following stages. Another method is based on using the transmitted bits to switch off the discriminator output 814 when a binary "1" is transmitted, to track "T0" instances only, or binary "0" to track "T1" instances. A completely different method is based on the transmitted bits. Yet another method can be used for AFC in FIG. 5. A conventional discriminator 812 is used, however the discriminator center frequency is located slightly off center to the desired signal spectral line. For example, if the spectral center T0R0 in FIG. 5 is used as the reference and the desired frequency is 1.5 GHz, then the discriminator 812 covers the range 1.2 to 1.5 GHz, and the control loop adjusts the system frequency to be in the higher end, i.e. 1.5 GHz up to acceptable tolerance. Such loop has ambiguity in the increase/decrease sense because if the frequency (To and T1) is too low, then T1R1 will veer into the discriminator band and the loop should increase the VCO 85 center frequency. If the frequency is too high, T0R0 will veer down and the VCO 85 should increase in frequency. Therefore the AFC loop should include loop polarity search.

The whole link-wide frequency control is obtained as follows. The two radios in the link are referred to as "AFC-master" and "AFC-slave". The choice of master and slave is arbitrary and not necessarily related to which radio is termed "master" or "slave" for other purposes. The AFC-master VCO 85 is driven by a DC voltage that represents the center frequency. This center frequency is largely determined by a resonator inside the VCO 85 circuit, as will be described in conjunction with FIG. 12. This DC voltage can be provided by the Digital section via a D/A port 815, thus allowing optional center frequency calibration over temperature. The AFC loop in the AFC-slave performs the local AFC function, thus tracking the center frequency of the AFC-master.

The signal deviation can be permanently set in production, without the need for close loop control. If a close loop control is desired for better accuracy, the deviation is controlled by monitoring the spectral content off-center in one of the IF frequencies. A frequency discriminator 812 senses the spectral content and a control loop adjusted by the transmit signal gain amplifier 83. Since the deviation reading and the discriminator 812 could be also affected by off-center tuning of the VCO 85 in both sides of the link, the deviation loop time constant is set at a much slower response time than the AFC. For example, the AFC time constant is set to 0.001 sec, and the deviation control to 0.01 sec. This loop has a drawback, as the discriminator 812 reading is affected by the deviation of both radios. For example, by measuring the deviation of a single spectral line, such as T0R1 in FIG. 6, the feedback signal is a sum of the "T" deviation and the "R" deviation. For better accuracy and stability, a preferred embodiment is provided in which the local radio can extract feedback based on the local deviation only, as follows. Discriminator 812 is centered at the signal T0R1 in FIG. 6. The frequency reading of this discriminator is proportional to the sum of the "T" deviation and the "R" deviation. A discriminator 820 is centered on the frequencies T0R0/T1R1 in FIG. 6, and the bipolar modulator 813 is used as above. The output of the modulator 813 is proportional to the difference of deviations. If the deviations of the "T" and "R" sides are defined as "DT", and "DR", respectively, then the following two equations describe the low-passed outputs of discriminator 812 (V812) and modulator 813 (V813):

$$V812 = K1(DT+DR)$$

$$V813 = K2(DT-DR)$$

where K1 and K2 are design-related constants that are known in production with much higher accuracy than the actual deviation, because they are set by the discriminators and modulators design, rather than the VCO tuning circuit which is less accurate in gain variation. A simple linear combination of V812 and V813 can isolate DT or DR as desired, and be fed to an integration stage 816 for deviation control. For example:

$$DT = V812/K1 + V813/K2$$

The above discussion and examples have demonstrated that, by observing the IF signals symbol frequencies, it is not possible to measure the absolute frequency of either transmitter, yet it is possible to measure and thus control the local deviation.

Figure 9:
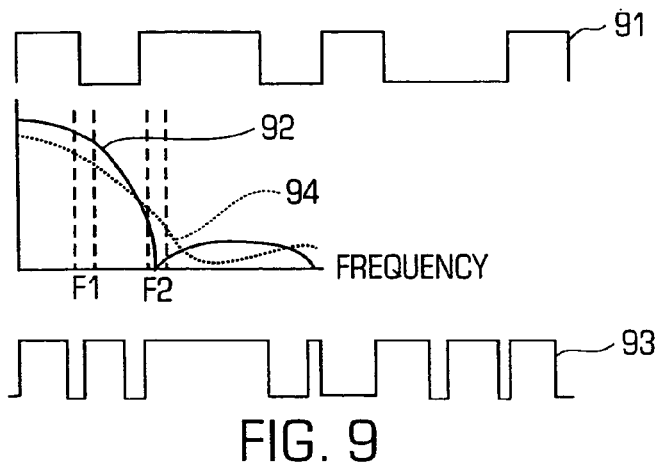
FIG. 9 illustrates receive binary signal waveform and spectrum at the comparator output when transmit and receive bit times are matched or skewed.

The third loop shown in FIG. 8 is a baud rate control loop (shown in FIG. 3 as element 38), may include a Rate Mismatch Detector 817, an Integrator 818 and a Microprocessor 819. The principle of detecting baud rate mismatch is illustrated in FIG. 9. The signals depicted are referred to the comparator 811 output in FIG. 8. If both TX and RX sides coincide in bit timing at the mixer 86, the waveform 91 has no bit, transition ambiguities. The power spectrum 92 of such bit stream would have a null at a frequency equal to the baud rate about a point marked "F2". If the timing is mismatched and the waveform change to the bottom one 93 (with bit transition ambiguities), the spectrum 94 will widen, fill the null at F2 and reduce its main lobe amplitude at frequencies below F2, such as the frequency marked "F1". It should be emphasized that as the baud rate increases, the null position F2 increases too, however the change in location of the null is less than 1%, while the main spectral lobe widens by up to 100%, thus the null position F2 is essentially fixed.

The Rate Mismatch Detector 817 includes a filter (such as one formed by a well known inductor and capacitor combination) and an envelope detector, such as a diode. The filter is a band pass filter at frequency F2 with a wide-band sufficiently to accommodate the approximately 1% change in baud rate. Alternatively, the filter can be a band pass centered at a frequency F1 substantially lower than F2. If an F2 filter is implemented, the goal of the control loop is to minimize the spectral content detected in band. If the F1 filter is implemented, or any low pass filter with cutoff below F2, then the goal is to maximize spectral content within the filter. To achieve either of these goals, a search process (implemented as computer code in a preferred embodiment) in the Microprocessor 819 is used. This method includes the steps of changing (increasing or decreasing) the baud rate, monitoring the detector 817 envelope response to that change and initiating more changes to a direction that is observed to be moving towards the desired goal.

The effect of the baud rate on bit timing for links with different distances can be determined as follows. First, a minimum baud rate "Fmin" is determined by system transmission requirements (payload bit rate and related overheard). Then, the maximum adjustable increment, "Fadd" is determined by the formula:

$$Fadd=1/(2\times path\ delay)$$

where "Path delay" is the propagation delay from the RF front-end mixing point at one radio to same point in the opposite radio. The shortest radio link distance has the shortest path delay, thus it requires the highest frequency addition and the transceiver design assumes a minimum distance, Dmin, for setting Fadd. The system may still operate at a shorter distance, but the ability to obtain perfect timing alignment is not guaranteed. For example, if the minimum distance is 30 meters, the round trip propagation delay in air is 200 ns, thus Fadd=5 MHz. For a baud rate above 1 GHz, Fadd is smaller than 0.5% of the total bit rate. Thus for a 1 GHz baud rate and Fadd of 5 MHz, perfect timing is guaranteed for link size larger than 30 m and for shorter links perfect timing is still periodically achievable. As the distance is decreased, there are exceedingly narrower bands (e.g., approximately every 15 cm) in which perfect timing is achievable, thus the link is usable even for distances below Dmin.

Figure 10:
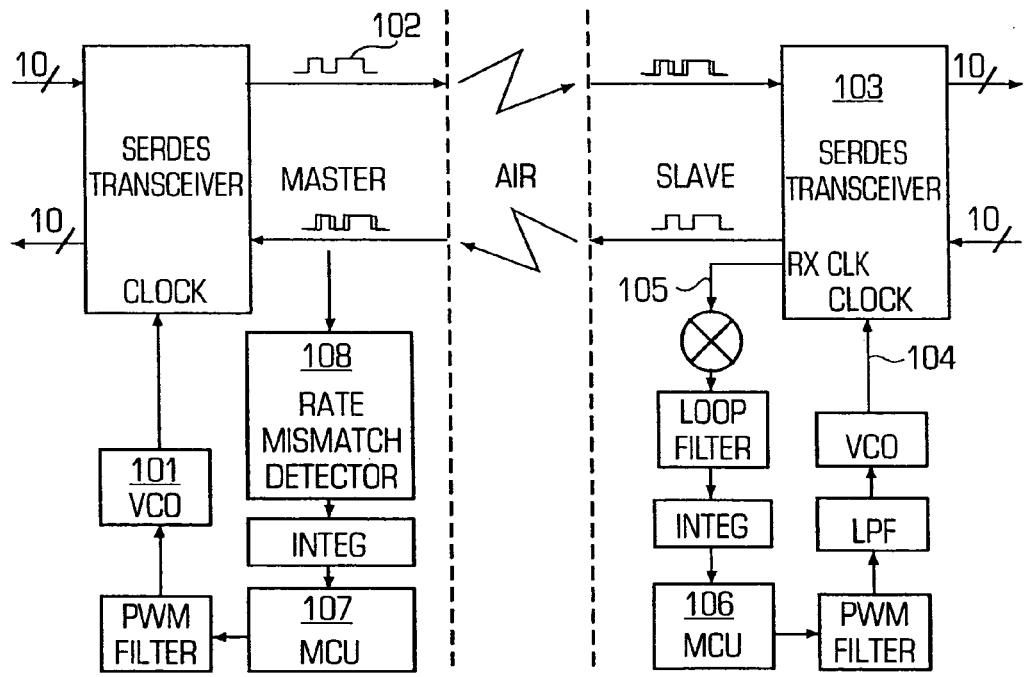
FIG. 10 shows the baud rate adjustment loop functions in the master and slave radios.

The whole-link operation of the baud rate control loop is shown in FIG. 10. The radios are arbitrarily assigned the terms "Master" and "Slave" for baud rate purpose as shown, regardless of master/slave assignments for other purposes. The baud rate is controlled based on the following process. The first part of the process is a search and capture phase that brings both side to a near-optimum match. A 90% match in timing is sufficiently good as a capture goal. To accomplish the search and capture phase, the Master sets initially an arbitrary baud rate by a VCO 101, which determines the baud rate for the transmitted signal 102. This initial baud rate may equal Fmin+0.5 Fadd. The Slave then receives the Master signal 102, and attempts to phase lock to it by a SERDES 103 built in PLL. If successful, the SERDES 103 tracks the receive clock frequency 105 and derives its own transmit clock 104 from the received clock 105. The receive timing will most likely not match the Slave timing and the Slave will increment the local clock frequency with an attempt to achieve lock. While the slave performs such increments at the rate of 1000 increments per second, for example, the Master perform a similar search at the rate of about 100 increments per second. Within 0.1 Seconds, the Master has tried 10 increments, and for each Master increment the Slave has tried 10 increments, thus one of these 100 combinations should be within $\frac{1}{10}^{th}$ of each other thus meeting the capture goal. Upon lock, the Slave simply tracks the receive clock 105 by the transmit VCO 104. The frequency incrementing, lock condition recognition and switching to tracking mode are all performed by a microprocessor 106. A Master microprocessor 107 also enters tracking mode based on the output of a Rate Mismatch Detector 108. Since the propagation delay remains fixed, subject only to occasional extreme weather changes or high-rise building swing, once a rate is determined, the microprocessor 107 can store the desired rate in memory and track changes slowly.

Figure 11:
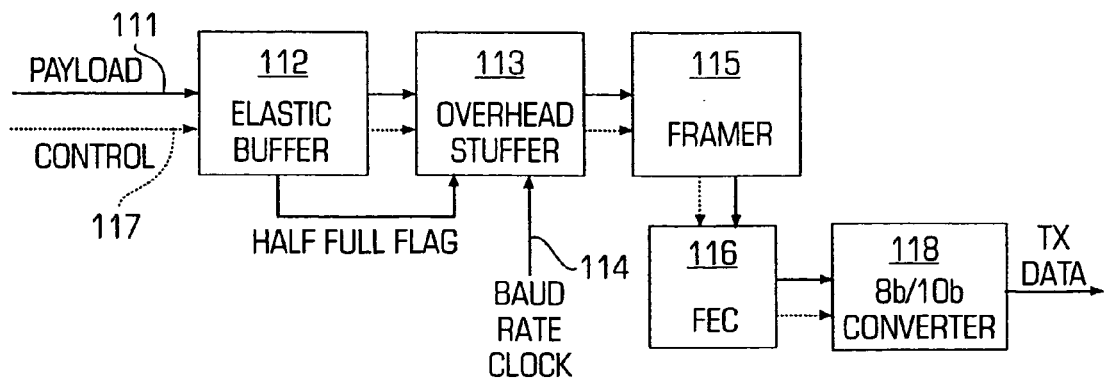
FIG. 11 is a block diagram of the data-path processing in the digital section including forward error correction and baud-rate adjusting word stuffer in the transmit side.

The overall digital signal transmission block diagram is shown in FIG. 11. A digital payload 111, such as Gigabit Ethernet traffic, is input to a well known elastic buffer 112. If no traffic exists at the system input, the system I/O section 32 (See FIG. 3) generates idle codes, which replace the payload 111. An overhead stuffer 113 is driven by a baud rate clock signal 114. The stuffer 113 injects a stuff-word whenever the elastic buffer 112 is less than half full based on a half-full flag as shown. While the stuff word can be any arbitrary word, just as commonly done by well-known protocols such as HDLC, a preferred alternative is to use a word that is not in the vocabulary of the normal payload, thus is unique for the purpose of stuffing. For example, the payload 111 can be organized as bytes. The payload may also contain control-words, which are represented by a byte with an additional "control" bit designation 117 wherein the control bit is propagated in parallel to the word via the various building blocks. The words at the stuffer 113 output are interrupted periodically to inject a frame overhead by a framer 115. The frame overhead can be of tow words, also unique. A commercially available coding scheme is preferred. Commercial SERDES devices for GigE applications recognize 10-bit words including payloads of 8-bit in which two overhead bits indicate "data" and other 10-bit control codes. It is convenient to allocate a frame overhead based on these overhead codes, using codes not commonly found in normal LAN traffic. To facilitate processing of those 10-bit words, an industry standard 8*b*/10*b* code converter 118 is used. The extra bits guarantee significant number of 0 to 1 transitions per each word to reduce the risk of synchronization loss. Finally, a forward error correction 116 block code overhead is added. For example, the transmission frame may include 2 frame overhead words, 186 payload and stuff words, and 16 error check words. The above example may represent a Reed Solomon block code RS(204, 188) over a Galois Field GF(256).

The receive side performs the opposite operations to those of FIG. 11, as familiar to engineers skilled in the art of digital communications. To facilitate low-cost implementation at the high bit rate in a GigE application, it is customary to implement the building block of FIG. 11 and the corresponding receive side using parallel buses, e.g. byte-wide or 10-bit word wide. Furthermore, some large system blocks, such as the Reed Solomon Decoder may still be too slow to process the entire traffic. For that purpose, block interleaving may be used in transmission and reception as desired. For example, four Reed Solomon decoders may run in parallel, such that received frames are sent in a round-robin cycles to each decoder. Such techniques are well known to engineers skilled in the art of digital system design.

Figure 12:
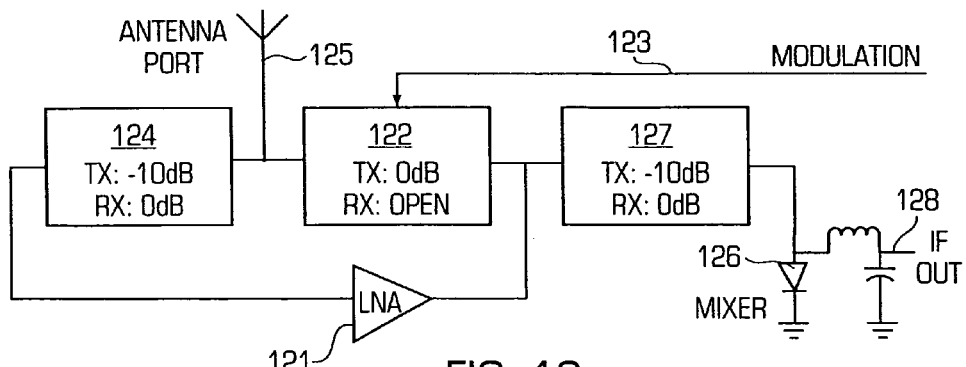
FIG. 12 is a block diagram of a preferred embodiment of a radio front-end circuit with a single active component.

While the system so far disclosed can operate with any RF front-end circuit designed for transmit modulation cancellation, it is further beneficial to provide a system with minimum active components for reliability improvement and cost reduction. A preferred embodiment block diagram of such an RF front-end is shown in FIG. 12, based on the frequency arrangement of FIG. 6. The system performs three amplifier-related functions with a single active amplifier. The amplifier, a commercially available low-noise amplifier (LNA) 121, is utilized in this circuit as an oscillator, a transmitter and a receiver. The oscillator function is accomplished by a resonator 122 in a feedback loop around the amplifier 121. The resonator 122 is frequency-tuned by the modulation signal 123, using a varactor diode coupled to the resonator 122. To complete the feedback loop, a filter 124 attenuates the transmit frequency only slightly, as indicated by the symbol Tx: −10 dB, i.e. 10 dB loss at the transmission frequency. This attenuation enables most of the oscillator energy to propagate to the antenna port 125, thus producing near maximum transmit power. The received signal at the antenna port 125 propagates via the filter 124 to the LNA 121 and is thus amplified. The amplified receive-signal is sent to a mixer 126 via a filter 127 that intentionally leaks part of the transmit signals too. This leaked signal is sufficiently strong to mix with the received signal at the mixer 126 and produce IF output via a low-pass filter 128. If needed, the mixer diode 126 can be forward biased slightly to improve sensitivity.

Figure 13:
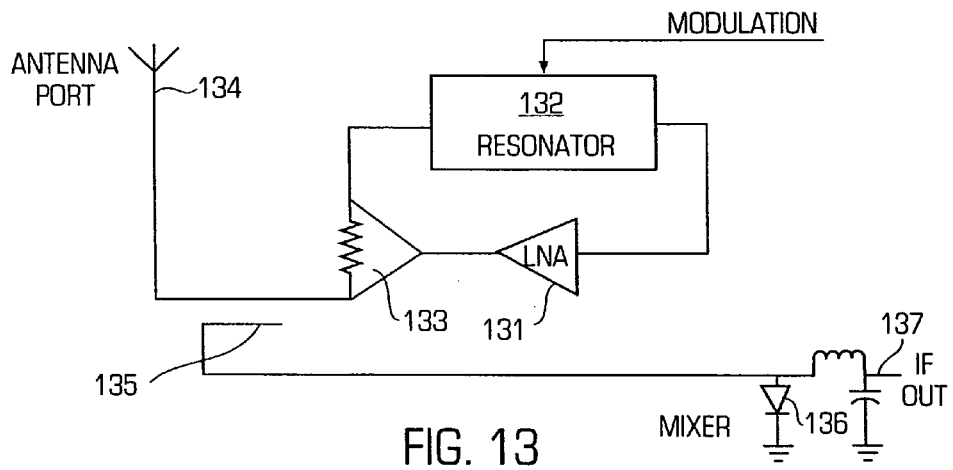
FIG. 13 is a block diagram of another preferred embodiment of a radio front-end circuit with fewer filters, but no receive gain.

While the preferred embodiment disclosed in FIG. 12 provides both receive gain and transmit power, another embodiment is disclosed in FIG. 13 for further reduction of the number of microwave components, and for suitability to both frequency arrangements of FIGS. 5 and 6. The circuit in FIG. 13 includes an amplifier 131, a modulated resonator 132 and a Wilkinson power divider 133 that splits the amplifier output to the feedback loop via the resonator 132 and an antenna port 134. A directional coupler 135 picks up a small fraction of the transmitted signal, e.g. $1/10^{th}$ of the power, and the majority of the received signal. This coupler 135 feeds the signals to the mixer 136 and low pass filter 137. The mixer diode 136 may be slightly forward biased for better sensitivity. This embodiment does not provide receive signal gain at the radio frequency that was provided by the other preferred embodiment in FIG. 12, thus some reduction in receive noise figure performance is expected, however the simplicity of this structure may justify it in some applications. In this embodiment, the amplifier 131 can be replaced by a Gunn diode or a similar single port device, thus providing an option of increased output power and cost-reduction.

Figure 13A:
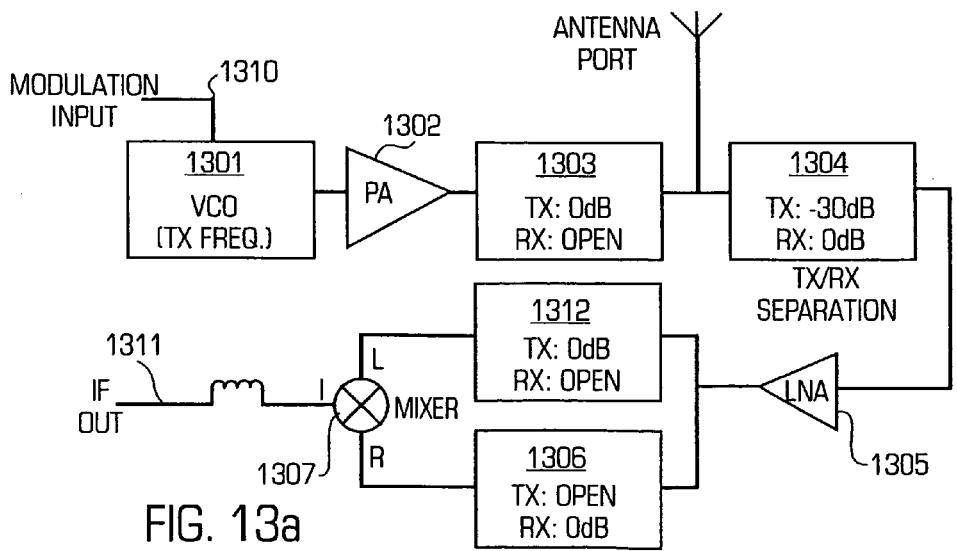
FIG. 13A is a is a block diagram of yet another preferred embodiment of a radio front-end circuit with separated amplifiers for transmit and receive side

For added performance at some increased cost, another embodiment of the RF front end is shown in FIG. 13A. In this preferred embodiment, the transmit and receive paths are further separated, allowing independent choice of components for each direction. On the transmit side, a VCO 1301 is followed by an optional power amplifier 1302, to provide higher transmit power. A diplexer is formed, consisting of a transmit side filter 1303 and receive filter 1304. The receive side signal path is followed by an LNA 1305, and then the signals are split by receive filter 1306 and transmit filter 1312 to feed a balanced mixer 1307. The pair of filters 1306 and 1312 form a diplexer which is similar to the pair of filters 13033 and 1304, thus further cost savings are achieved by using essentially the same diplexer design for both diplexer functions, where both diplexers are either identical or include simple changes such as metallization mask change. The demand from the receive filter 1304 in rejecting transmit signal is higher than the equivalent filter 124 in FIG. 12, however it is still much less than a diplexer in a conventional transceiver with no modulation cancellation. The use of a balanced mixer is preferred because a balanced mixer reduces the presence of unwanted harmonics of the transmit modulation present at the mixer inputs, especially if the transmitted signal has accumulated FM to AM conversion while propagating via various filters between the VCO 1301 and the mixer 1307. While this embodiment uses more components, it allows easier separations of the transmitter modulation input signal 1310 from the IF signal 1311 than the two previous embodiments.

The reliable operation of the embodiments of FIGS. 12, 13 and 13a rely on a small circuit layout and high Q factors in the resonator and filters. If the oscillator feedback close-loop delay approaches or exceeds the reciprocal of the resonator bandwidth, spurious oscillations are possible, because the loop may have gain above unity and a zero phase periodically every multiple of the reciprocal of the loop delay away from the main center frequency. For example, if the loop is 3 GHz wide for unity gain, a loop delay of about 330 picoseconds or more may cause spurious oscillations. To minimize this risk, the physical size of the components and interconnections must be small. The use of dielectric resonators may potentially solve this problem, but usually requires manual adjustment that is expensive. A preferred approach is the use of filters and resonators based on Micro Systems Technology (MST). Such structures have been fabricated and described in the literature, usually under the term "RF MEMS". The assignee, BridgeWave Communications, Inc, has disclosed in a patent application titled "MICROCIRCUITS WITH SCULPTED GROUND PLANE" filed on May 1, 2002 as U.S. patent application Ser. No. 10/130,002 (which is incorporated herein by reference), structures and methods for fabrication that are preferred for use in this invention.

Figure 14:
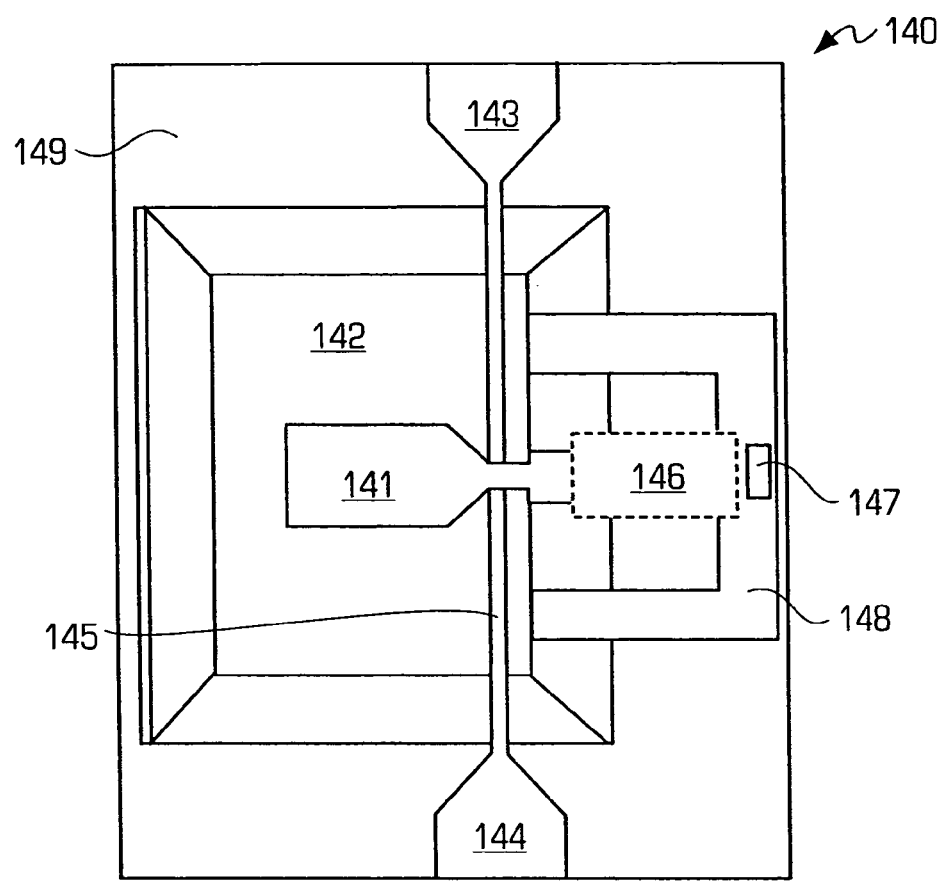
FIG. 14 illustrates a varactor-tunable resonator suitable for MST implementation of the resonator in FIGS. 12 and 13.
Figure 15:
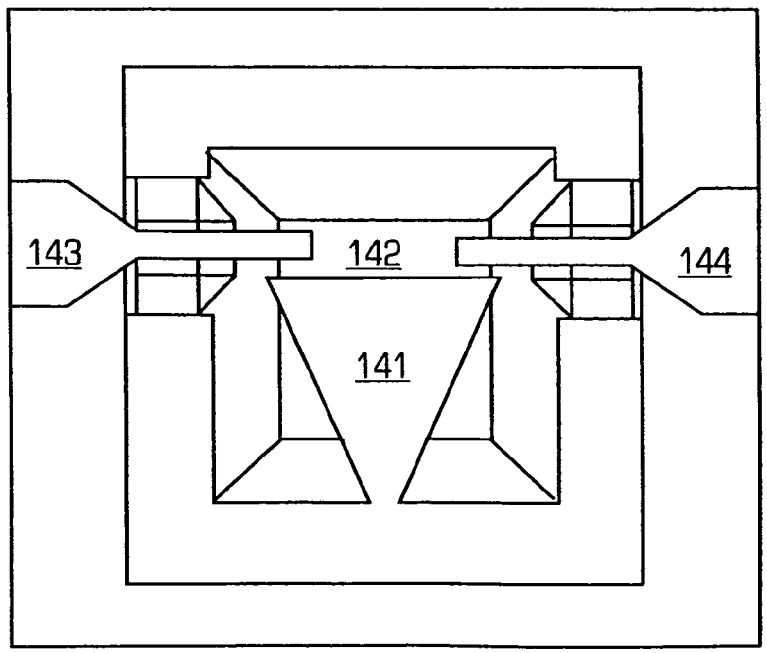
FIG. 15 illustrates a filter with feed-through signal suitable for MST implementation of the filters in FIGS. 12 and 13.
Figure 16:
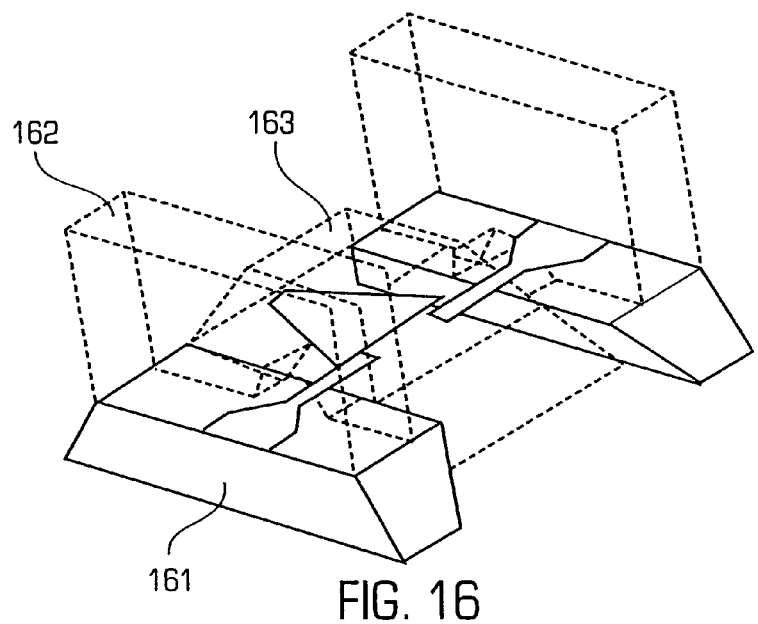
FIG. 16 is a 3-D simulation-model for the filter in FIGS. 14 and 15.

Examples of the preferred filter and resonator geometries are shown in FIGS. 14, 15 and 16. FIG. 14 shows a top view a tunable resonator 140, with the metal cap removed to exposed the inside structure. A resonating element 141 is printed on a membrane suspended above a ground plane 142 and attached to a substrate 149, such as high resistivity silicon. Two electrodes 143 and 144 provide input/output ports, and are connected by a transmission line 145, which is loaded by the resonator 141. A varactor chip diode 146 is coupled to the resonator 141 and a ground-via 147 is connected to a ground conductor 148. A DC voltage to tune the diode is provided via one of the ports 143, 144, superimposed to the RF signal. The dimensions of the entire die of FIG. 14 for a 60 GHz application are approximately 3 mm by 3.5 mm, as desired for small size. Similarly, a filter geometry is shown in FIG. 15. The structure is identical to that of FIG. 14, with a different geometry that provides the desired frequency response. This structure can be used for the filters 124 and 127 in FIG. 12. For a 60 GHz application, the die dimensions are 2.5×3.1 mm. FIG. 16 is a simulation model for the filter of FIG. 15. This model illustrates a perspective view of the silicon 161 and ground planes 162, 163 required for analyzing the filter performance.

A complete RF front-end including the above filters, resonator and amplifier may be implemented on a substrate of about 12×12 mm. This small size allows mounting of this circuit directly at the feed point of a high gain antenna, thus further reducing signal losses and cost.

Figure 17:
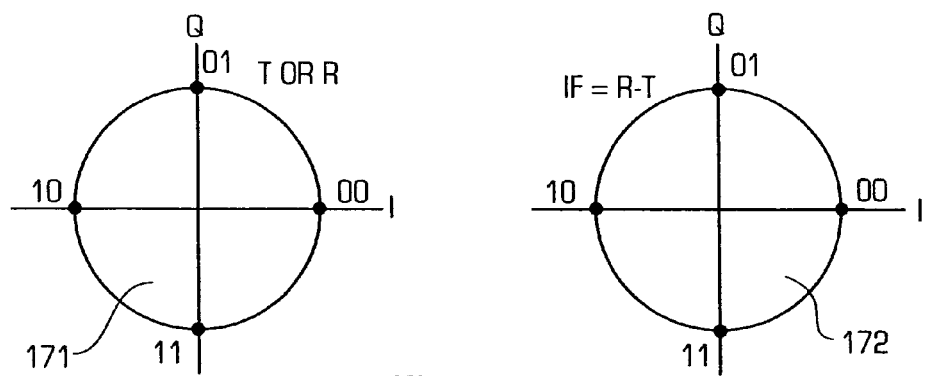
FIG. 17 shows constellation diagrams for QPSK transmit and received IF before modulation cancellation.

While the modulation cancellation techniques disclosed above used frequency modulation (FSK), other modulation schemes can be used, although constant-envelope is preferred. To demonstrate phase modulation, the following preferred embodiment is disclosed. The transmission is Quaternary Phase Shift Keying (QPSK). The radio block diagram as shown in FIGS. 3 and 4 is unchanged, however the VCO 85 in FIG. 8 is changed to a QPSK-modulated oscillator, as known to engineers skilled in the art of microwave radio circuit design. Like the FSK case, the inclusion of a timing correction by baud rate matching is preferred. The demodulators are replaced by QPSK demodulators too. The modulation may be coherent or differential. For coherent modulation, a constellation 171 in FIG. 17 is shown as an example, with a sample of bit value allocation (00, 01 etc.). The same constellation is used for both sides of the link. The transmitted symbol streams in both sides include overhead codes, which help the establishment of phase synchronization as customary in coherent QPSK techniques. In such coherent scheme, the combined transmit/receive phases in the IF 172 are still QPSK, however the constellation points represent the phase difference between the transmitted received phases. Suppose that the "R" frequency is higher than the "T" frequency, such as the band arrangement "T" 601 and "R" 602 in FIG. 6. The IF phase 172 will be the difference between T and R 171. Phase is measured counter clockwise from the "I" axis. For example, suppose that "01" was transmitted (as T in 171), and "00" was received from the opposite link. The phase difference between "00" and "01" in constellation 171 is 270 degrees, thus the IF constellation will decode "11". Since the transmitter sent 01, the digital modulation cancellation section adds the two numbers modulo 4 as flows. (11+01) mod 4=00 which is the correct received value. Therefore the logic modulation cancellation for this particular symbol bit value allocation is an addition modulo 4. For any other constellation allocation, an appropriate truth table can be used and the proper logic can be implemented.

The QPSK transmission could also be differential, simplifying the receiver structure at the slight expense of bit error rate. The constellation 171 in FIG. 17 is still valid, except that each angle position represents the increment from the previous symbol. The IF interim demodulator is differential and the logic modulation cancellation is still an addition modulo 4.

Figure 18:
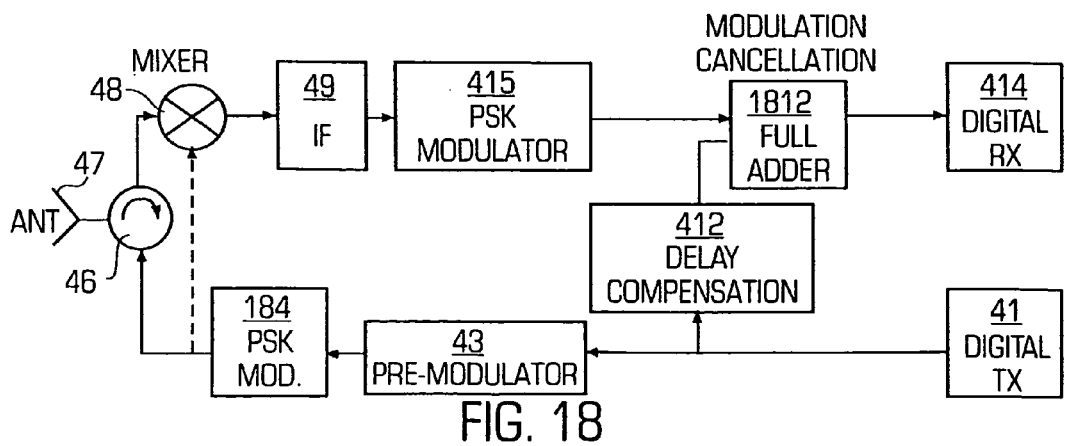
FIG. 18 shows the main building blocks in a radio transceiver associated with PSK-based logic-level modulation cancellation

Similar to the building blocks in FIG. 4, a PSK transceiver is depicted in FIG. 18. The only differences are a PSK modulator 184 replacing the FSK modulator 44 and a Full Adder 1812 replacing the XOR gate 412.

While the foregoing has been with reference to a particular embodiment of the invention, it will be appreciated by those skilled in the art that changes in this embodiment may be made without departing from the principles and spirit of the invention as set forth in the appended claims.

The invention claimed is:

1. A radio for communicating digital data over an analog communication channel, comprising:
   a filter that inputs a binary-level modulated signal transmitted via a noisy analog communication channel and outputs a filtered modulated signal;
   a demodulation circuit that is electrically connected to the filter and performs two-level demodulation of the filtered modulated signal to produce a binary demodulated signal having a serial format;
   a SERDES integrated circuit, electrically connected to the demodulation circuit that receives the binary demodulated signal, the SERDES integrated circuit further comprising a clock recovery circuit that recovers a clock timing of the binary demodulated signal and locks onto the clock timing from the binary demodulated signal and a deserializer circuit that converts the binary demodulated signal with the serial format into a binary demodulated digital signal having a parallel format; and
   a digital section that receives the parallel format binary demodulated digital signal.

2. The radio of claim 1, wherein the demodulation further comprises frequency shift keying (FSK) demodulation.

3. The radio of claim 2, wherein the demodulation further comprises phase shift keying (PSK) demodulation.

4. The radio of claim 3, wherein the demodulation further comprises quadrature four-level phase shift keying demodulation.

5. The radio of claim 4, wherein said four-level phase shift keying demodulation is differential.

* * * * *